UNITED STATES PATENT OFFICE.

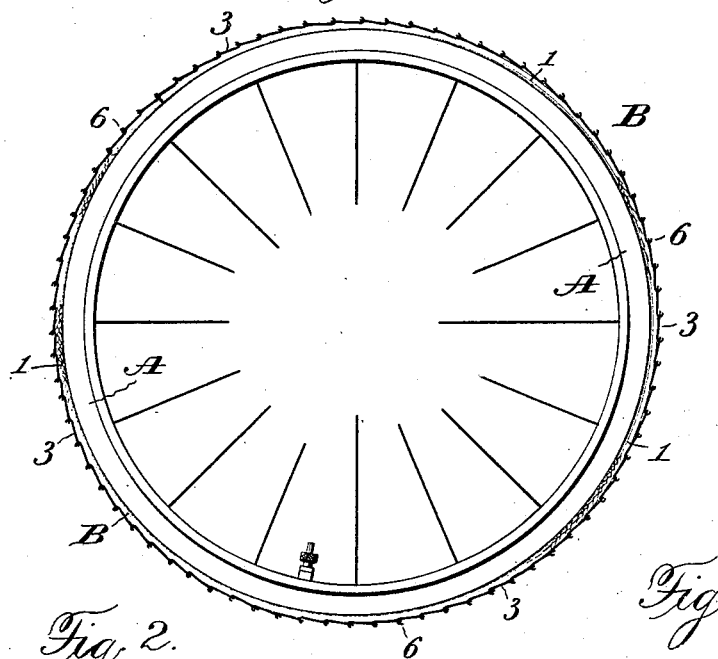

EDWARD C. REHFELD, OF HORICON, WISCONSIN.

TIRE-ARMOR.

SPECIFICATION forming part of Letters Patent No. 667,457, dated February 5, 1901.

Application filed February 14, 1900. Serial No. 5,188. (No model.)

*To all whom it may concern:*

Be it known that I, EDWARD C. REHFELD, a resident of Horicon, in the county of Dodge and State of Wisconsin, have invented certain new and useful Improvements in Tire-Armor; and I do hereby declare the following to be a full, clear, and exact description of the invention, such as will enable others skilled in the art to which it appertains to make and use the same.

My invention relates to an improvement in tire-armor, the object of the invention being to provide a device of the above-mentioned character which will be extremely simple in construction, cheap to manufacture, easily placed in position on a pneumatic tire or removed therefrom, and which when in position on a tire will protect the same from injury and effectually prevent any possibility of the wheel slipping.

With this object in view the invention consists in certain novel features of construction and combinations and arrangements of parts, as will be more fully hereinafter described, and pointed out in the claims.

In the accompanying drawings, Figure 1 is a view illustrating my improvements on a pneumatic tire. Fig. 2 is a view of a portion of the armor removed from the tire. Fig. 3 is a detail view of a link forming part of the armor. Fig. 4 is a detail view of a link forming part of the chain when the armor is to be employed on the front or steering wheel tire of a bicycle, and Figs. 5 and 6 are views in section of the different forms of lugs.

A represents a pneumatic tire, and B my improved armor placed thereon. The armor B comprises a strip of canvas or other strong fabric 1, to which is sewed or otherwise secured a chain 3, composed of a series of wire links bent to form a transverse outwardly-curved member 4 and an inwardly-bent member 5 at each end of said transverse member 4, provided at their free ends with outwardly and rearwardly projecting hooks 6, forming teeth or lugs to prevent slipping, and also adapted to engage the transverse member 4 of the next adjacent link. The outer face of the hooked portions 6 are preferably flattened slightly to give the armor a wider bearing, and hence a firmer grip on the ice or frozen ground.

This form of my invention is especially adapted for use on the driving or rear wheel of a bicycle.

When the armor is to be employed for use on the front or steering wheel of a bicycle, the outer hooked portions 6 of the links are beveled or inclined at each side to form a sharp longitudinal cutting edge 7 to effectually prevent any side slipping of the wheel.

My improved armor is preferably made the size of the circumference of a tire when inflated, and when it is desired to place the armor in position on the tire the air in the tire is permitted to escape, when the armor can be readily placed in position and the tire inflated to effectually hold it in place.

The flexible strip and chain are preferably made to fit snugly around the tire, and the ends of the strip may be sewed or otherwise secured together or may be made longer than the chain and overlap at their ends.

My armor is adapted for use on any vehicle employing pneumatic tires, and hence I do not wish to be limited to bicycles alone, and various slight changes might be resorted to in the general form and arrangement of the several parts described without departing from the spirit and scope of my invention, and hence I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a tire-armor, a series of links connected together to encircle a tire, each link composed of a single piece of wire and comprising an outwardly-curved cross-bar, integral arms or members projecting forwardly and inwardly from the respective ends of said cross-bar, the free end of each arm or member bent to form a lug disposed parallel thereto, said lugs having flattened outer faces which constitute the tread of the armor.

2. A tire-armor comprising a strip of flexible material, a series of wire links disposed on said strip, each link comprising a curved cross-bar, arms or members projecting forwardly from the cross-bar, and lugs at the free ends of said arms or members, said lugs disposed parallel with the arms or members and having flattened outer faces constituting the tread of the armor, and means for securing said arms or members of the links to the flexible strip.

In testimony whereof I have signed this specification in the presence of two subscribing witnesses.

EDWARD C. REHFELD.

Witnesses:
EDW. H. MATTHES,
LOUIS DIETZ.